(12) United States Patent
Lein et al.

(10) Patent No.: US 8,584,544 B2
(45) Date of Patent: Nov. 19, 2013

(54) METHOD AND DEVICE FOR CONTROLLING A GEARSHIFT MECHANISM

(75) Inventors: Lars Lein, Kongsberg (NO); Jan Gunnar Royland, Kongsberg (NO); Ole Andre Gjerpe, Kongsberg (NO); Christer Svenkerud, Kongsberg (NO); Ole Jonny Waerp, Kongsberg (NO); Viggio L. Norum, Kongsberg (NO)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 1881 days.

(21) Appl. No.: 11/440,765

(22) Filed: May 25, 2006

(65) Prior Publication Data
US 2006/0272436 A1 Dec. 7, 2006

(30) Foreign Application Priority Data
Jun. 2, 2005 (DE) .......................... 10 2005 025 267

(51) Int. Cl.
*F16H 59/00* (2006.01)
(52) U.S. Cl.
USPC .......................................... 74/335; 74/473.18
(58) Field of Classification Search
USPC .............................................. 74/335, 473.18
See application file for complete search history.

(56) References Cited

U.S. PATENT DOCUMENTS

| 6,695,747 | B2 * | 2/2004 | Zimmermann et al. ....... 477/123 |
| 2001/0004850 | A1 * | 6/2001 | Kim ........................... 74/473.18 |
| 2004/0112158 | A1 * | 6/2004 | Norum et al. ................... 74/335 |
| 2004/0129100 | A1 * | 7/2004 | Zimmermann et al. ........ 74/335 |

FOREIGN PATENT DOCUMENTS

DE  102 06 561 A1  10/2002

* cited by examiner

*Primary Examiner* — David D Le
*Assistant Examiner* — Derek D Knight
(74) *Attorney, Agent, or Firm* — Simpson & Simpson, PLLC

(57) ABSTRACT

In a method for controlling a gearshift mechanism, the gearshift mechanism having at least one shifting element, a gear release element, a shift actuator and a selector actuator, in which the shifting element is movable by the selector actuator along a selector track, and is movable from the selector track at sites spaced from each other by means of the shift actuator into shift tracks for engagement of a gear, and the gear release element is coupled to the shifting element, so that during engagement of the new gear, it disengages a previously engaged gear, the shifting element, after engagement of a gear, is moved by the shift actuator in the direction toward the selector track into a rest position right in front of the discharge of the shift track into the selector track, in which it remains, until it is moved for engagement of a new gear.

5 Claims, 2 Drawing Sheets

APPENDIX A

US 8,584,544 B2

METHOD AND DEVICE FOR CONTROLLING A GEARSHIFT MECHANISM

CROSS REFERENCE TO RELATED APPLICATIONS

This patent application claims priority of German Patent Application No. 10 2005 025 267.2, filed on Jun. 2, 2005, which application is incorporated herein by reference.

BACKGROUND OF THE INVENTION

Automatic transmissions or transmissions that shift individual gears operated by actuators are being increasingly used in modern vehicles, since not only is a gain in comfort achieved with them relative to manual transmissions, but so are consumption advantages. So-called double-clutch or synchronous transmissions have gained special interest, as shown, for example, in FIG. 3.

Figure 2:
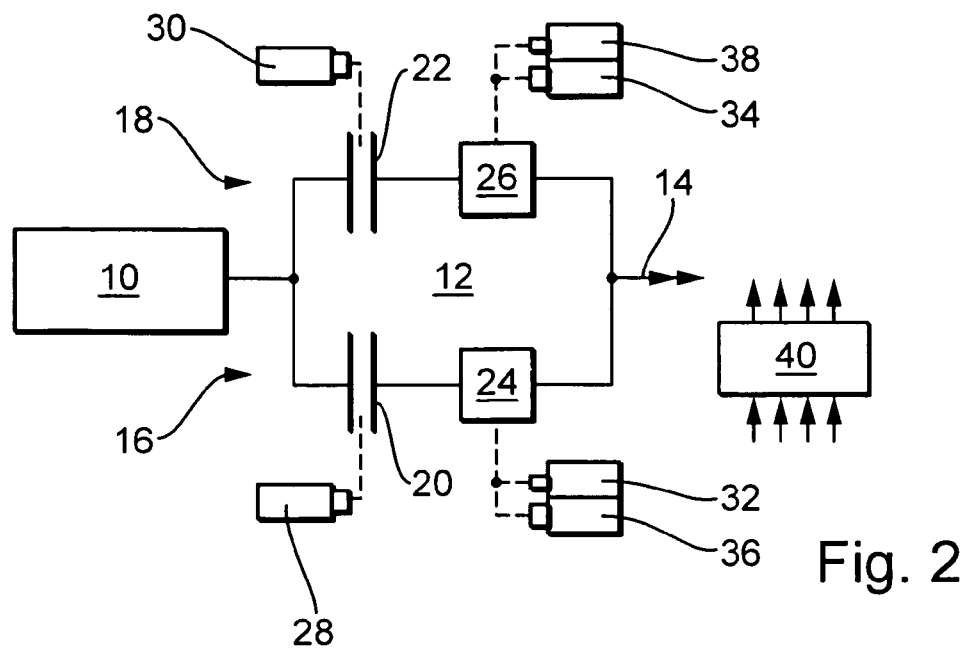

According to FIG. 2, a drive motor 10, normally an internal combustion engine, is connected via a double-clutch transmission, designated overall with 12, to a driveshaft 14, which leads to the driven wheels of a vehicle. The double-clutch transmission 12 has two partial transmissions 16 and 18 arranged parallel to each other, each with a clutch 20 and 22 and a manual transmission 24, 26. A clutch actuator 28 and 30 is provided to operate each of the clutches. The partial transmissions 24, 26 are each operated by a selector actuator 30 and 32 and a shift actuator 36 and 38. A common selector actuator and shift actuator is advantageously provided for both manual transmissions. An electronic control device 40, whose inputs are furnished relevant parameters for operation of the clutches and gear shifting, is used to control the actuators.

The design and function of such a double-clutch transmission, as well as the control device provided for it, are known per se and are therefore not explained in detail. The manual transmissions 24 and 26 cooperate, so that each of the consecutive gears is shifted by one of the transmissions, for example, the even-numbered gears by one transmission and the odd-numbered gears by the other transmission, a reverse gear being additionally assigned to one of the transmissions.

Figure 4:
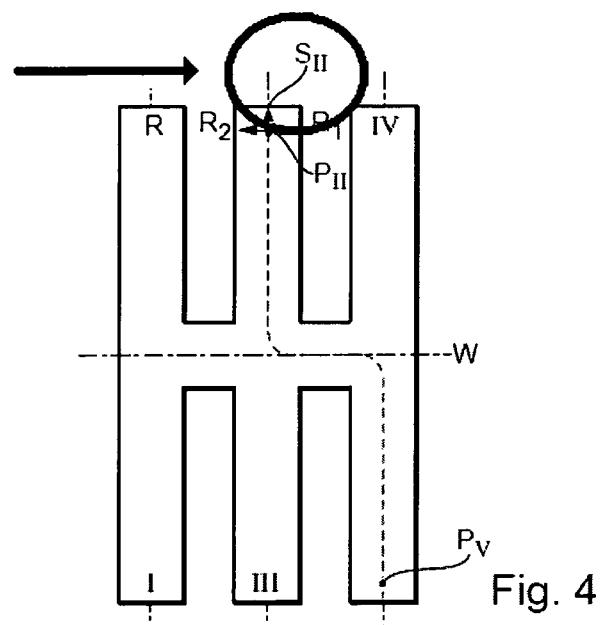
Figure 3:
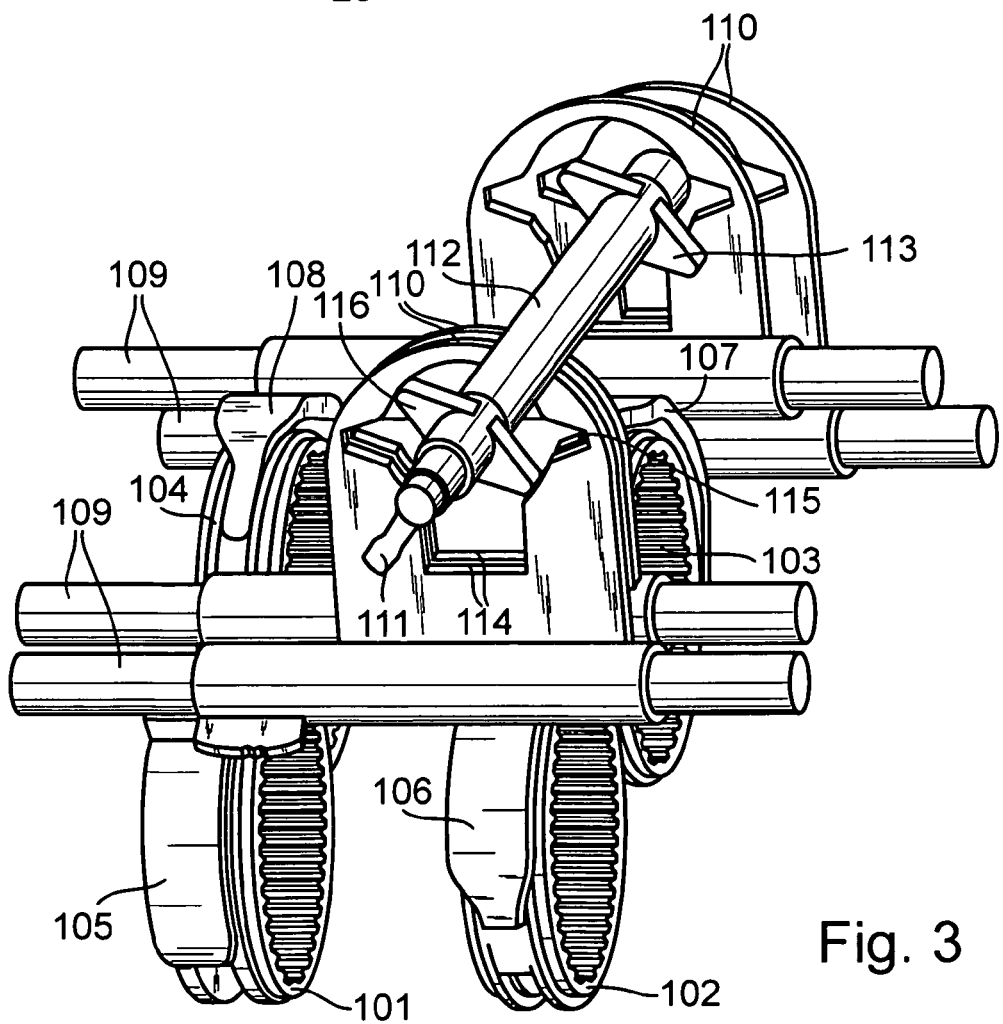

A mechanism for shifting a double-clutch transmission is described, for example, in DE 102 06 561 A1, from which FIGS. 3 and 4 are taken.

According to FIG. 3, a shift operating mechanism to operate the two partial transmissions 24 and 26 of the double-clutch transmission 12 of FIG. 3, which is modified in that only one common selector actuator and a common shift actuator is provided for both partial transmissions, contains four clutch sleeves 101, 102, 103 and 104, each of which is connected to a selector fork 105, 106, 107 and 108. One group of gears, or the gears of one of the partial transmissions 24 and 26, is operated by means of the coupling sleeves 101 or 104, the other group of gears is operated by means of the clutch sleeves 102 and 103. A first selector finger 111, which forms a shifting element, and an additional selector finger, not visible in FIG. 4, serve for engagement of gears. Gear release elements, designed as double cams 113 and 116, then ensure that, during engagement of a gear of one partial transmission, all other gears of this partial transmission are disengaged. The selector forks 105, 106, 107 and 108 are arranged axially movable on shafts 109; the selector fork clevises are designed, so that they can each be connected to a selector finger 111 or a double-cam 113, 116. For this purpose, first partial areas 114 are designed for coupling with a selector finger 111 and second partial areas 115 are designed for coupling with double cam 113. For engagement of a gear, the selector finger 111 enters into connection with the end region 110 of the corresponding selector fork 105 or 106, the selector shaft 112 being moved in the axial direction. At the same time, the double cam 113 is connected to the corresponding selector fork 107 or 108, which belongs to the same group of gears or to the same partial transmission. Rotation of the selector shaft 112 pivots the selector finger 111, so that the selector fork 105 or 106 on shaft 109, and therefore also the corresponding clutch sleeve 101 or 102, is displaced and the corresponding gear is engaged. At the same time, rotation of the double cam 113 causes disengagement of the previously engaged gear of the same transmission, if this was assigned to a different shift track.

If a double-clutch transmission is not involved, but an ordinary transmission with only one clutch and one drive train, double cams acting as gear release elements are connected to all additional selector fork clevises, so that it is guaranteed that during engagement of a new gear, a previously engaged gear is disengaged. In a double-clutch transmission, the mechanism permits engagement of the new gear with simultaneous disengagement of the previous gear of the corresponding partial transmission, or disengagement occurring just beforehand, the gear engaged in the other partial transmission remaining uninfluenced by a gear shift in the partial transmission just shifted.

The selector shaft 112 generally has a shoulder (not shown in FIG. 4), with which its axial movability is limited to a narrow angle range, in which the selector finger 111 in the depicted example is roughly perpendicular, and the ends of the double-cams 113, 116 are flush with the corresponding cutouts in the end regions 110 of the selector forks. Rotatability of the selector shaft 112 from the rotation position with a perpendicular selector finger 111 for engagement of a gear by movement of one of the selector forks along the shaft 109 in one or the other direction is only possible at a predetermined axial position of the selector shaft 112. This limited adjustability of the selector shaft 112 can be caused by the fact that the shoulder rigidly connected to the selector shaft 112 engages in a template, in which, for example, the pattern according to FIG. 4 is left open in a five-speed transmission with reverse gear.

In the depiction according to FIG. 4, W is designated as selector track. $S_1$ to $S_3$ denote shift tracks, in which the gears R, I, III, III and IV, V lie. The selector shaft 112 (FIG. 3) is movable by means of a selector actuator, for example, the selector actuator 32 of FIG. 2, in the direction of selector track W, and rotatable by means of a shift actuator, for example, the shift actuator 36, around its longitudinal axis, if the selector finger is situated in one of the shift tracks $S_1$, $S_2$ or $S_3$.

The position of the selector finger and the additional elements rigidly connected to the selector shaft 112 is recognized in the control device 40 in known fashion, for example, by the fact that an incremental counter is assigned to each of the actuators 32 and 36, which records a change in position of the selector shaft in the selector or shift direction. By referencing the counter states at specific stops, for example, an end stop on the end of the selector track W and an end stop on the end of one of the shift tracks, the absolute position of the selector shaft 112, with respect to the selector and shift operation, is known.

In order to check the functional reliability of the transmission, it is expedient, as shown by engagement of second gear with reference to FIG. 4, to travel to an end stop $S_{II}$ of the shift track $S_2$ during or immediately after engagement of a gear, and to verify achievement of this end stop in the control device 40. On reaching the end stop $S_{II}$, one of the side edges $R_1$, $R_2$ of the shift track $S_2$ is advantageously approached further, in order to verify the corresponding position of the selector shaft. After reaching stop $S_{II}$ and one of the edges $R_1$ or $R_2$, perfect function of the shift mechanism is guaranteed, and it is also guaranteed that the second gear is engaged.

A peculiarity of the procedure just outlined is that the shifting element, or the selector finger in the depicted example of FIG. 4, is situated in the position designed $P_{II}$ when second gear is engaged and remains in this position as long as a new gear is not required. If a new gear, for example, fifth gear, is required, the shifting element must be moved from position $P_{II}$ from the shift track $S_2$, into the selector track W, then along selector track W to shift track $S_3$, and then in shift track $S_3$ into position $P_V$. This long path is naturally connected with a relatively long duration, which elapses from the requirement for engagement of fifth gear to actual engagement of fifth gear.

SUMMARY OF THE INVENTION

The underlying task of the invention is to devise a method and apparatus to control a gearshift mechanism that permits a rapid gear change.

The part of the aforementioned task directed toward the method is solved with a method for controlling a gearshift mechanism, said gearshift mechanism containing at least one shifting element, a gear release element, a shifting actuator and a selector actuator, in which the shifting element is movable by means of the selection actuator along a selector track, and is movable from the selector track to sites spaced from each other by means of the shifting actuator into shift tracks for engagement of a gear, and the gear release element is coupled to the shifting element, so that during engagement of a new gear, a previously engaged gear is disengaged, and the shifting element, after engagement of a gear, is moved by the shifting actuator in the direction toward the selector track into a rest position right before discharge of the shift track into the selector track, in which it remains until it is moved for engagement of a new gear.

In order to achieve a high degree of operational reliability, the shifting element is advantageously moved by the shift actuator during or immediately after engagement of a gear by additional movement toward an end stop on the end of the shift track belonging to the engaged gear and, after reaching the rest position, is moved by the selector actuator toward a side edge of the shift track.

The part of the task of the invention directed toward the device is solved with the device for controlling the gearshift mechanism, said gearshift mechanism containing at least one shifting element 111, a gear release element 113, 116 and a selector actuator 32, 34, a shift actuator 36, 38, in which the shifting element can be moved by means of the selection actuator along a selector track, and can be moved from the selector track at sites spaced from each other by means of the shift actuator into shift tracks $S_1$, $S_2$, $S_3$ for engagement of a gear, and the clutch gear release element is coupled to the shifting element, so that during engagement of a new gear, it disengages a previously engaged gear, said device having sensors to record the position of a shifting element and a control device 40 to control the selection actuator and the shift actuator, characterized by the fact that the control device 40 controls the selection actuator 32, 34 and the shift actuator 36, 38 to execute the method.

The invention can be used in all gearshifts, in which a shifting element that causes engagement of a gear can be moved back to a position after engagement of the gear in the shift track, in which it reaches the selector track, at least approximately, without this leading to disengagement of the gear. Disengagement of the gear can be caused by the shifting element then acting as gear release element during further movement of the shifting element, or, as in the shift mechanism outlined with reference to FIG. 3, by a separate gear release mechanism, which is advantageously rigidly connected to the shifting element. A mechanism, like the one in FIG. 2, is also referred to as active interlock mechanism. It ensures that only one gear of a transmission or partial transmission can be engaged in a double-clutch transmission.

BRIEF DESCRIPTION OF THE INVENTION

Figure 1:
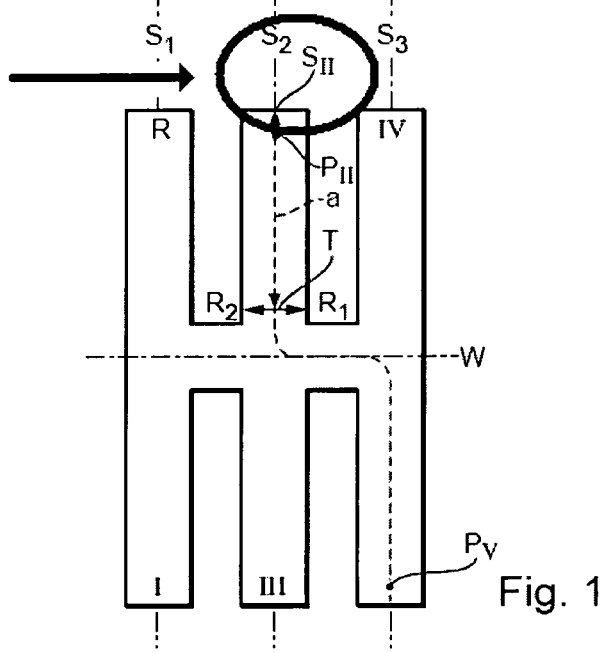

The invention is explained below by means of schematic drawings and with additional details. In the drawings:

FIG. 1 shows a known shifting scheme for a transmission with three shift tracks and a selector track to explain the functional process of a method according to the invention, FIG. 2 shows a known double-clutch transmission in its basic design, FIG. 3 shows a shift mechanism for operation of a double-clutch transmission with active interlock function; and, FIG. 4 shows a shift scheme corresponding to FIG. 1.

DETAILED DESCRIPTION OF THE INVENTION

In the present explanation of FIG. 1, reference is made to the already explained FIGS. 2 to 4.

Let it be assumed, according to FIG. 1, that the selector finger, for example, selector finger 111 according to FIG. 3, was moved from the selector track W into the shift track $S_2$ for engagement of the second gear in position $P_{II}$. Immediately after engagement of second gear, which is generally achieved before the end stop $S_{II}$ of shift track $S_2$ is reached, the selector shaft 112 is moved by controlling the shift actuator by means of control device 40, so that a component that scans the template according to FIG. 1 connected to it is moved against the stop $S_{II}$ or the operated selector fork itself reaches an end stop. Reaching of this stop is established, for example, by a current increase in the corresponding actuator, or by an equivalent counter state of the corresponding incremental counter. If the functional capability of the shift actuator is checked in this way, the shift actuator is moved under the control of control device 40 along path a in the direction toward selector track W, until position T close to selector track W is reached. After reaching position T, the shift actuator is disengaged and the selector actuator, operated so that the scanning component rigidly connected to selector shaft 112 is moved against a side edge $R_1$ or $R_2$ of the shift track and, in this way, checks, on the one hand, whether the shifting element is situated in the correct shift track and, on the other hand, checks the functional capability of the selector actuator. If this has occurred, the shifting element remains in position T until a new gear is required. If, as in the depicted example, fourth gear is required as next gear, the shifting element is only initially moved from position T along the short path into selector track W, then moved along selector track W into shift track $S_3$ and moved in shift track $S_3$ into position $P_V$.

As is immediately apparent from comparison of FIGS. 1 and 4, the path from T to $P_{IV}$ is much shorter than the path from $P_{II}$ to $P_V$. The shorter path leads to a significantly shorter reaction or shifting time of the shifting mechanism controlled by the method according to the invention.

For example, if the path, by which the shifting element can be moved from the selector track up to achievement of an end stop of the shift track, is 20 mm, the position T is 17 mm away from the end stop, i.e., 2 mm in front of the discharge of the shift track into the selector track, if a tolerance in the direction of the shift tracks in both directions of 1 mm exists within the selector track. This 17 mm or somewhat smaller amount, if position $P_{II}$ according to FIG. 4 is somewhat removed from the stop position $S_{II}$, will be saved in the travel path, by which the shifting element must be moved for engagement of a new gear.

In the mechanism according to FIG. 4, in the depicted example, second gear is disengaged, whereas the shifting element is moved from the selector track W in the direction toward position $P_V$.

In other gear shifts, the procedures occur accordingly, in which case in a double-clutch transmission, for example, when a shift is made from second gear to third gear and third gear is already preselected, this only occurs by opening of a clutch and closing of the other clutch.

LIST OF REFERENCE NUMBERS

10 Drive motor
12 Double-clutch transmission
14 Drive shaft
16 Transmission branch
18 Transmission branch
20 Clutch
22 Clutch
24 Partial transmission
26 Partial transmission
28 Clutch actuator
30 Clutch actuator
32 Selector actuator
34 Selector actuator
36 Shift actuator
38 Shift actuator
40 Control device
101 Clutch sleeve
102 Clutch sleeve
103 Clutch sleeve
104 Clutch sleeve
105 Selector fork
106 Selector fork
107 Selector fork
108 Selector fork
109 Shaft
110 End region
111 Selector finger
112 Selector shaft
113 Double cam
114 Partial region
115 Partial region
116 Double cam

What is claimed is:

1. A method for controlling a gearshift mechanism, said gearshift mechanism having at least one shifting element, a gear release element, a shift actuator and a selector actuator, in which the shifting element is movable by the selector actuator along a selector track, and is movable from the selector track at sites spaced from each other into shift tracks by means of the shift actuator for engagement of a gear, and the gear release element is coupled to the shifting element, so that during engagement of the gear, the gear release element disengages a previously engaged gear, comprising the step of moving the shifting element by the shift actuator, after engagement of the gear, in the direction toward the selector track into a rest position located adjacent to the intersection of the shift track and the selector track, in which rest position the shifting element remains, until the shifting element is moved for engagement of a new gear, wherein moving the shifting element into the rest position after engagement of the gear significantly shortens a first path the shifting element must travel between the gear and the new gear during engagement of the new gear.

2. The method according to claim 1, wherein the shifting element is moved by the shift actuator during or immediately after engagement of the gear by additional movement against an end stop at an end of the shift track belonging to the engaged gear and, after reaching the rest position, is moved by the selector actuator against a side edge of the shift track.

3. A device for controlling a gearshift mechanism, said gearshift mechanism comprising at least one shifting element (111), a gear release element (113, 116) and a selector actuator (32, 34), a shift actuator (36, 38), in which the shifting element is movable by the selector actuator along a selector track, and is movable from the selector track at sites spaced from each other by means of the shift actuator into shift tracks ($S_1$, $S_2$, $S_3$) for engagement of a gear, and the gear release element is coupled to the shifting element, so that during engagement of the gear, the gear release element disengages a previously engaged gear, and a control device (40) to control the selector actuator and the shift actuator, wherein the control device (40) controls the selector actuator (32, 34) and the shift actuator (36, 38) to move the shifting element by the shift actuator, after engagement of the gear, in the direction toward the selector track into a rest position located adjacent to the intersection of the shift track and the selector track, in which rest position the shifting element remains, until the shifting element is moved for engagement of a new gear, wherein moving the shifting element into the rest position after engagement of the gear significantly shortens a first path the shifting element must travel between the gear and the new gear during engagement of the new gear.

4. The device according to claim 3, wherein the shifting element is moved by the shift actuator during or immediately after engagement of the gear by additional movement against an end stop at an end of the shift track belonging to the engaged gear and, after reaching the rest position, is moved by the selector actuator against a side edge of the shift track.

5. The device recited in claim 3 wherein the rest position is located from the selector track approximately one tenth of a distance of a second path, wherein the second path runs between the selector track and an end stop of the shift track.

* * * * *